US009747012B1

(12) United States Patent
Moczydlowski

(10) Patent No.: US 9,747,012 B1
(45) Date of Patent: *Aug. 29, 2017

(54) OBTAINING AN IMAGE FOR A PLACE OF INTEREST

(71) Applicant: Google Inc., Mountain View, CA (US)

(72) Inventor: Wojciech Moczydlowski, Forest Hills, NY (US)

(73) Assignee: Google Inc., Mountain View, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/753,839

(22) Filed: Jun. 29, 2015

Related U.S. Application Data

(63) Continuation of application No. 13/712,938, filed on Dec. 12, 2012, now Pat. No. 9,088,625.

(51) Int. Cl.
*G06F 15/16* (2006.01)
*G06F 3/0484* (2013.01)
*H04L 29/08* (2006.01)

(52) U.S. Cl.
CPC .......... *G06F 3/04842* (2013.01); *H04L 67/18* (2013.01)

(58) Field of Classification Search
None
See application file for complete search history.

(56) References Cited

U.S. PATENT DOCUMENTS

| 7,409,431 B2 | 8/2008 | Yamaguchi et al. |
| 7,424,218 B2 | 9/2008 | Baudisch et al. |
| 7,774,782 B1 | 8/2010 | Popescu et al. |
| 8,120,641 B2 | 2/2012 | Kang et al. |
| 8,189,964 B2 | 5/2012 | Flynn et al. |
| 8,310,522 B2 | 11/2012 | Jeong et al. |
| 8,521,128 B1 | 8/2013 | Welsh et al. |
| 2002/0107965 A1 | 8/2002 | Piccionelli |

(Continued)

FOREIGN PATENT DOCUMENTS

| AU | 2008212499 A1 | 12/2008 |
| DE | 10156414 A1 | 9/2002 |

(Continued)

OTHER PUBLICATIONS

"Amazon Mechanical Turk" retrieved from <http://en,wikipedia.org/wikilAmazon-Mechanical Turk>, as modified Aug. 13, 2011.

(Continued)

*Primary Examiner* — Brian Whipple
(74) *Attorney, Agent, or Firm* — Lerner, David, Littenberg, Krumholz & Mentlik, LLP

(57) ABSTRACT

A system and method is disclosed for requesting and obtaining an updated digital image for a place of interest. A system may be configured to provide, for display to a first user, a representation of a place of interest and a user interface for requesting an updated image of the place of interest. The first user may use the user interface to request a recent image of the place of interest. On receiving the request, a determination may be made whether a second user is in an area related to the place of interest. On determining a second user is in the area, the second user is informed of the request. The second user may then respond by capturing a new image for the place of interest and providing the new image to the system. On receiving the new image from the second user, the representation may be updated with the new image and made available for display to the first user.

18 Claims, 5 Drawing Sheets

(56) References Cited

U.S. PATENT DOCUMENTS

| | | |
|---|---|---|
| 2004/0172472 A1 | 9/2004 | Jackel et al. |
| 2006/0075053 A1 | 4/2006 | Xu et al. |
| 2006/0079200 A1 | 4/2006 | Hirouchi et al. |
| 2007/0024527 A1 | 2/2007 | Heikkinen et al. |
| 2008/0045236 A1 | 2/2008 | Nahon et al. |
| 2008/0119131 A1 | 5/2008 | Rao |
| 2009/0157876 A1 | 6/2009 | Lection |
| 2010/0009700 A1 | 1/2010 | Camp, Jr. et al. |
| 2010/0161506 A1 | 6/2010 | Bosenick et al. |
| 2010/0239131 A1 | 9/2010 | Murakami |
| 2010/0309225 A1 | 12/2010 | Gray et al. |
| 2011/0071843 A1 | 3/2011 | Gilvar et al. |
| 2011/0102605 A1 | 5/2011 | Hannaford |
| 2011/0154264 A1 | 6/2011 | Aravamudan et al. |
| 2011/0161002 A1 | 6/2011 | DeVries et al. |
| 2011/0165893 A1 | 7/2011 | Hyung et al. |
| 2011/0312374 A1 | 12/2011 | Chen et al. |
| 2012/0300020 A1 | 11/2012 | Arth et al. |
| 2013/0033568 A1 | 2/2013 | Kim et al. |
| 2013/0095855 A1 | 4/2013 | Bort |
| 2013/0332856 A1 | 12/2013 | Sanders et al. |
| 2014/0095630 A1 | 4/2014 | Wohlert et al. |

FOREIGN PATENT DOCUMENTS

| | | |
|---|---|---|
| KR | 2010124947 | 11/2010 |
| WO | 2010090906 A2 | 8/2010 |

OTHER PUBLICATIONS

"Amazon Mechanical Turk—Welcome," retrieved from <htt s:llwww.mturk.com/mturklwelcome>. retrieved Mar. 19, 2013.

Nurminen, Antii, "Mobile 3D City Maps", IEEE Computer Graphics and Applications, Jul./Aug. 2008, pp. 20-31.

Dao, et al., "Location Based Services: Technical and Services Issues", GPS Solutions, 2002.

ISR/WO for PCT App. No. PCT/US12/59853, mailed on Mar. 8, 2013. (pp. 1-10).

Co-pending U.S. Appl. No. 13/272,556 entitled "Method, System, and Computer Program Product for Obtaining Images to Enhance Imagery Coverage" by David Bort, filed Oct. 13, 2011.

Co-pending U.S. Appl. No. 13/662,073 entitled "Method, System, and Computer Program Product for Gamifying the Process of Obtaining Panoramic Images" by Evan Rapoport, filed Oct. 26, 2012.

Co-pending U.S. Appl. No. 13/662,124 entitled "Method, System, and Computer Program Product for Providing a Target User Interface for Capturing Panoramic Images" by Scott Ettinger, filed Oct. 26, 2012.

OBTAINING AN IMAGE FOR A PLACE OF INTEREST

CROSS-REFERENCE TO RELATED APPLICATIONS

The present application is a continuation of U.S. patent application Ser. No. 13/712,938, filed on Dec. 12, 2012, the disclosure of which is incorporated herein by reference.

BACKGROUND

Digital images of a landscape, cityscape, or other scene may be stored and later retrieved in response to a search for a related place of interest. Some images may be displayed in connection with digital maps so as to more accurately portray a place of interest when further detail of that place of interest is requested. However, digital images are fixed in time, and activities depicted in the scene at the time the image was taken may change. In this respect, digital images are not useful for determining current conditions at a place of interest. For example, if a person were to search for a digital image of a train station to determine current crowd conditions, it would be unlikely that the conditions depicted in any image returned by the search would be reliable for a current or future time period.

SUMMARY

The subject technology provides a system and computer-implemented method for requesting and obtaining an updated digital image for a place of interest. According to one aspect, a computer-implemented method may include providing, for display to a first user, a representation of a place of interest and a user interface for requesting an updated image of the place of interest, receiving, from the first user, a request for a recent image of the place of interest, informing a second user of the request, receiving from the second user, in response to the informing, a new image for the place of interest, and providing the new image to the first user. Other aspects include corresponding systems, apparatuses, and computer program products for implementation of the computer-implemented method.

In another aspect, a machine-readable medium may include instructions stored thereon that, when executed by a processor, cause a machine to perform a method of requesting and obtaining an updated digital image for a place of interest. In this regard, the method may include providing, for display to a first user, a representation of a place of interest and a user interface for requesting an updated image of the place of interest, receiving, from the first user, a request for a recent image of the place of interest, determining that a second user is in an area related to the place of interest, informing the second user of the request, receiving from the second user, in response to the informing, a new image for the place of interest, and providing the new image to the first user. Other aspects include corresponding systems, apparatuses, and computer program products for implementation of the machine-readable medium.

In a further aspect, a system may include a processor and a memory. The memory may include instructions that, when executed by the processor, cause the processor to provide, for display to a first user, a representation of a place of interest and a control for requesting an updated image of the place of interest, receive, from the first user, a request for a recent image of the place of interest, determine that a second user is in an area related to the place of interest, inform the second user of the request, receive from the second user, in response to the informing, a new image for the place of interest, update the representation with the new image, and provide, for display to the first user, the representation updated with the new image.

These and other aspects may provide one or more of the following advantages. A user who would not otherwise visually know the most recent state of a place of interest or its surroundings, can now receive that visual information in near-real time without having to travel to a location associated with the place of interest. Additionally, the subject technology may contribute to maintaining comprehensive visual information for a database of places of interest by encouraging a user pool to continuously provide updated images for places of interest stored in the database.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
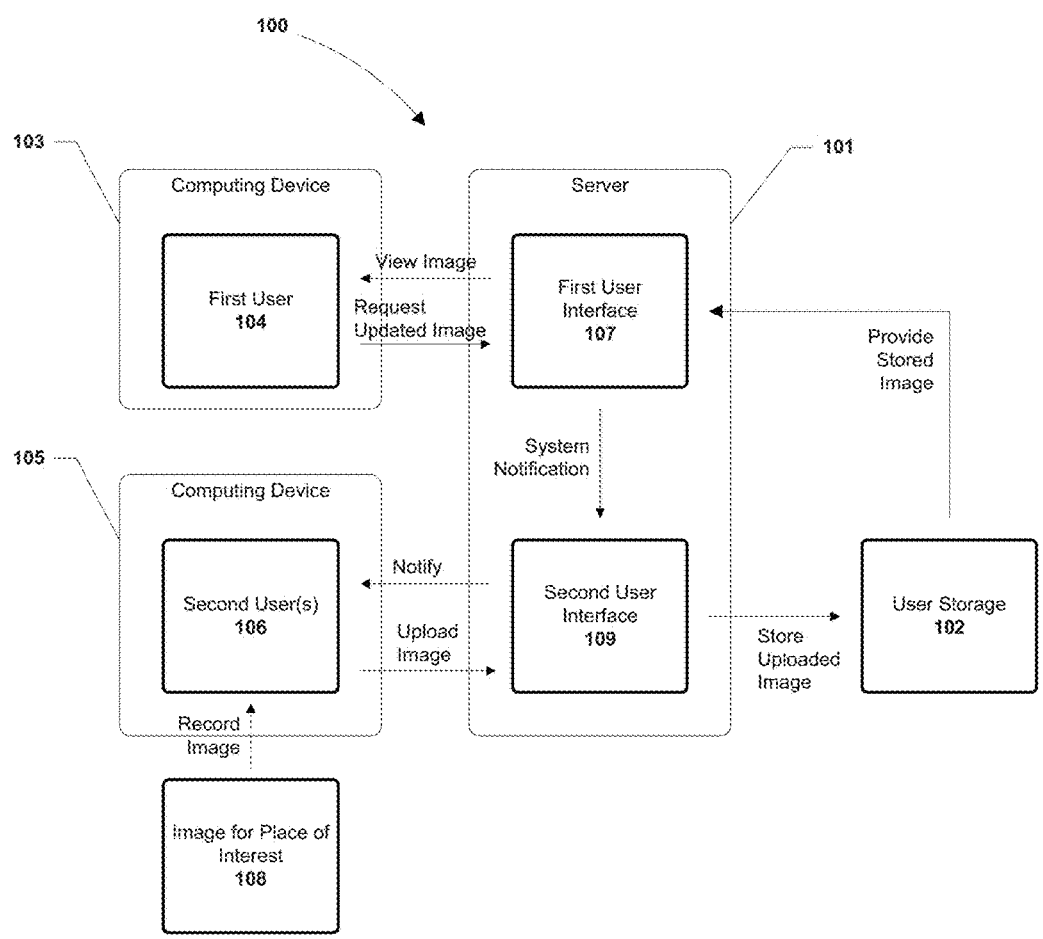
FIG. 1 is a diagram of an example system for requesting and obtaining an updated digital image for a place of interest.

FIG. 1 is a diagram of an example system 100 for requesting and obtaining an updated digital image for a place of interest, according to one aspect of the subject technology. System 100 includes a computing system 101 configured to provide digital images (for example, digital photos or video) to users over a network (for example, the Internet, a LAN, or WAN). In some implementations, computing system 101 includes one or more servers that provide an online image sharing service, wherein users may share images with other users. The online image sharing service may include a website, mobile application, or other medium capable of providing digital pictures and other graphics to the user. The online sharing service may include, for example, a social network that includes photo sharing capabilities, or an online map that displays pictures for selected geographic locations, or include a search engine which returns images in response to a query for a certain subject matter.

Computing system 101 is operably connected to a storage 102, for storing and retrieving images for download or display to users who access computing system 101. Storage 102 may include a database, file system, solid-state drive, one or more flash memory devices, hard disk, or the like. In this regard, one or more user computing devices may connect to computing system 101 to download images stored in storage 102. Such user computing devices may include, for example, a smartphone, personal or notebook computer, tablet computer, PDA, a television or other display device with one or more computing devices embedded therein or attached thereto. In the depicted example, computing system 101 is operably connected to a first computing device 103 associated with a first user 104, and a second computing device 105 associated with a second user 106.

First user 104 may, for example, view a first user interface 107 provided by computing system 101 that includes a representation of a place of interest. The representation may be an image (for example, a digital photo or video) that depicts the place of interest, or may be space reserved on a webpage that is updatable to include an image. In some examples, the representation may include a social media message (with or without an image) that may be updated with a new image. User interface 107 may be a webpage for displaying the place of interest, including a control for requesting an updated image of the place of interest. Accordingly, first user 104 may use first user interface 107 to request an updated image. For example, when the control is activated, a request for a recent image of the place of interest is received at computing system 101. Computing system 101 then informs second user 106 of the request.

Second user 106 is first determined to be in an area that includes the place of interest. In some implementations, second computing device 105 may be, for example, a location-aware device (for example, a GPS-enabled smart phone) configured with software for, when activated by a user, informing computing system 101 of its location. Second computing device 105 may, for example, include one or more setup screens that enable second user 106 to consent to providing the location of device 105 to computing system 101. In this regard, second computing device 105 may be configured to temporarily transmit location data for the limited purpose of providing computing system 101 the ability to determine when second user 106 moves into an area that includes the place of interest. The location data is encrypted before transmission. During a journey, device 105 may periodically inform the user (for example, by way of a blinking icon on the device's display screen) that the device is transmitting location data. The setup screens may further enable the user to revoke the user's consent to use transmitted data, purge stored data, and/or disable further transmission of location data.

Accordingly, computing system 101 may receive, from second computing device 105, an indication that second user 106 is in an area that includes the place of interest. If second computing device 105 indicates that second user 106 is in the area that includes a place of interest corresponding to a request, computing system 101 transmits a message to second computing device 105 to inform second user 106 of the request.

Second computing device 105 is configured with software for receiving messages pertaining to requests for updated images and for enabling the upload of images stored on second computing device 105 to computing system 101. Second computing device 105 may include a camera for taking digital images. Accordingly, second user 106, on being informed by computing system 101, may respond by using the camera to capture (for example, take a picture of) a new digital image 108 of the place of interest and then upload new digital image 108 to computing system 101 using a second user interface 109 displayed on a display screen of second computing device 105.

On receiving the new image from second computing device 105, computing system 101 provides the new image to first user 104. In some implementations, providing the new image includes updating the previously described representation of the place of interest at first user interface 107 with the new image. The representation may be updated to display the new image only for first user 104 (for example, during an active session or when accessing the representation while signed in to a user account), or may be updated so that the new image is displayed or available for display to all users (for example, on access to a corresponding website responsible for display of the image). In some implementations the new image may be provided to first user 104 by electronic messaging (for example, SMS, email, social media, or the like). Prior to using the subject technology, first user 104 may provide computing system 101 with contact information (for example, as part of a registration process), including a messaging protocol for receiving new images for requests made by first user 104. In one example, a request for an updated image of a representation for a place of interest is only made if the user making the request is authenticated to a user account associated with the image sharing service. That user account may include the previously described contact information.

In some implementations, computing system 101 notifies first user 104 of one or more periods of time in which a response to the request is more likely than not. Computing system 101 receives, for a subscribing user population over a period of time, indications of where those users are located. The location data from the contributing user population is anonymized and temporarily stored for the limited purpose of determining how many users visited a particular area at any one time. An area in which computing system 101 may attempt to locate one or more second users 106 of the request may be determined on receiving the request. Once the area is determined, computing system 101 locates the one or more second users 106 and transmits the information pertaining to the request to the one or more second users 106. For example, the area may include all locations within a radius around a coordinate location corresponding to the place of interest associated with the request. On receiving the request from first user 104, computing system 101 may determine the area, and then determine an average number of users that are present in the area for one or more periods of time. One or more periods of time in which the average number of users in the area satisfies a predetermined threshold are then provided to first user 104. First user 104 makes a selection at first user interface 107 and the selected period is received at computing system 101. Computing system 101 may then delay informing users in the area until the selected period of time.

Overuse of the subject technology, or "request spamming," may be limited by allowing each user a maximum number of requests. A predetermined maximum number of requests for a user is set and stored in connection with the user's user account, and a request made by the user is allowed only when the user is authenticated to the user account. Computing system 101 may further store the number of requests received over a period of time (for example, for the last 24 hours) in connection with the user account. When a request is made, the system verifies that the requesting user has not exceeded the maximum number of requests before informing another user of the request. In some implementations, computing system 101 may store, for a first user, a number of requests made by the first user and a number of times that the first user provided an updated image in response to a request from another user. computing system 101 may then verify, on receiving the request, that a ratio between the number of requests made by the first user and the number of times that the first user provided an updated image satisfies a predetermined threshold before informing the second user of the request.

In another aspect, subscribed users who answer requests by providing an updated image for a place of interest via second user interface 109 may be provided with a reward. The reward may include an offering (for example, a monetary value) made by the requesting user, or a number of incentive points that indicate the user's overall contribution to others. In one example, computing system 101 may transmit the offering in an electronic message to second user 106. Additionally or in the alternative, the number of requests a user is allowed to make may be balanced against the number of times the user provides an updated image in response to a request. The number of requests may be decremented when a request is made, but incremented when an updated image is provided.

The previously described system may also be implemented as a cloud service, whereby a first user 104 can submit a "challenge" for other second users 106 to provide an updated image. The challenge may include, for example, a position or area where the object of the image is located, a brief description, and period of time in which the challenge must be completed. For example, the description may state "I'm a journalist and I need good pictures for an article," or "I'm curious to know how crowded this mall is today." The challenges may be stored in storage 102 and indexed in a challenge group. The challenge group may then be made available to one or more second users 106.

In some implementations, first interface 107 may include a digital map. A first user 104 may activate a challenge button and select an area of the map where the object of the requested image(s) is located. When a second user 106 navigates to and views a location of the map (for example on second user interface 109), the challenges associated with the viewed location may be displayed to the user.

A second user 106 may access second user interface 109 to register to complete a challenge or group of challenges. Additionally or in the alternative, a user may register to receive all challenges as they become available. Computing system 101 may then receive periodic location updates from second computing device 105 and, if there is a challenge matching the position of second computing device 105, transmit challenge information for a challenge matching a location of second user 106. Second user 106 may then accept the challenge at second user interface 109, capture the requested image, and upload the image to computing system 101. Second user interface 109 may include controls for enabling second user 106 to rate each challenge, for example, in a chronological order as "accepted," "not accepted," and "reason why not accepted." Once a challenge is accepted by second user 106 it may disappear from a list provided to all users seeking to accept the challenge. Alternatively, the challenge may on the list remain until it is completed.

Figure 2:
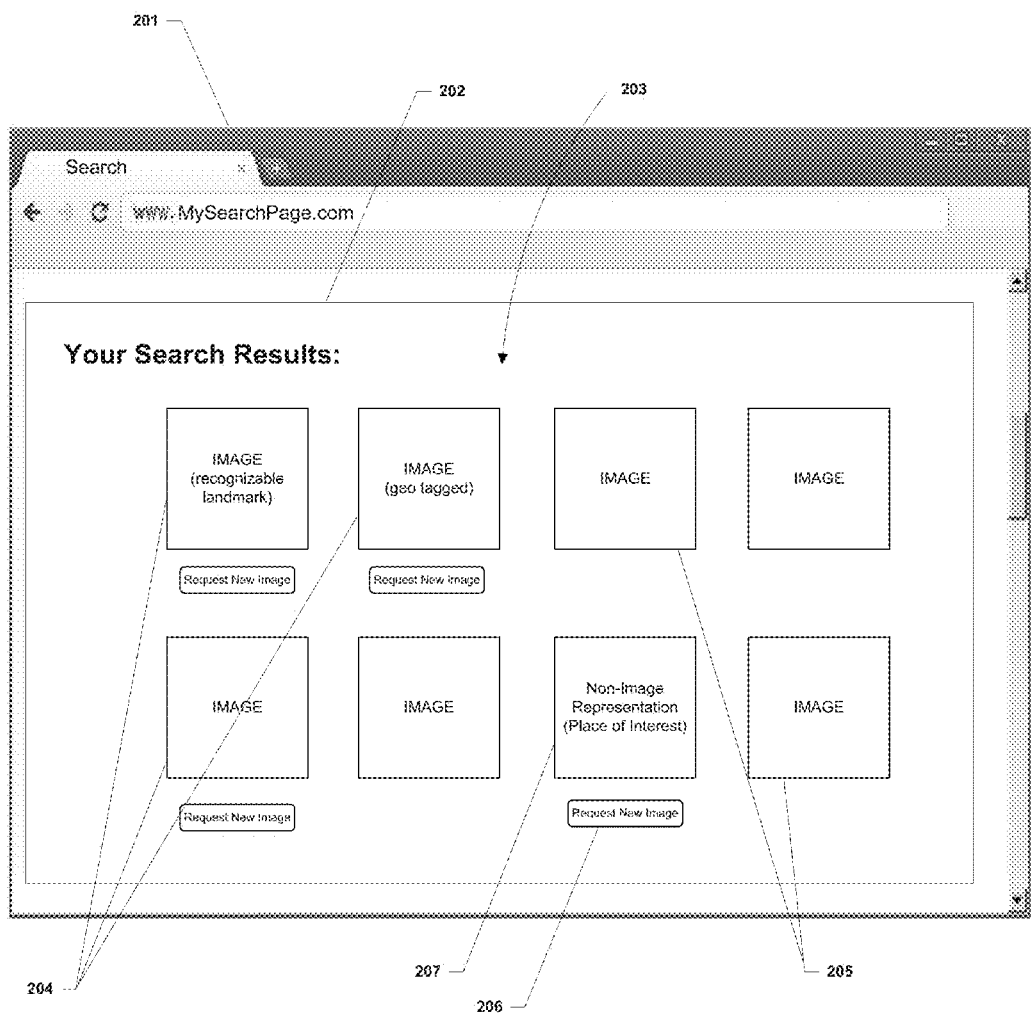
FIG. 2 is a diagram of an example web page for displaying images, including images of places of interest and corresponding controls for requesting updated images for the places of interest.

FIG. 2 is a diagram of an example web page for displaying images, including images of places of interest and corresponding controls for requesting updated images for the places of interest, according to one aspect of the subject technology. In the depicted example, a web browser 201 displays a webpage 202 of image search results returned to web browser 201 in response to a search query for subject matter related to a place of interest. A group 203 of images related to the place of interest are displayed on webpage 202, including updatable images 204 determined to depict the place of interest or a location related to the place of interest, and non-updatable images 205.

While, non-updatable images 205 may include cartoons or other graphical depictions, or other images that cannot be definitively classified as corresponding to a place of interest, it should be understood that any type of image may be designated as updatable, so long as the image can be associated with information identifiable by a second user 106. For example, the subject technology may also apply to physical items, such as consumer products, and updatable images 204 may include images of items associated with a product identifier (for example, a SKU or barcode). In this regard, first user 104 may request an updated image for a product found in a store. Second user 106 may receive a description of the product and, on locating the product, may verify its product identifier, for example, by scanning a barcode or entering a SKU of the product using second computing device 105.

Computing system 101 may determine that one or more updatable images 204, in the group 203 of images, are of places of interest by analysis of meta data in the images. For example, updatable images 204 may include images depicting a recognizable landmark or building, or may be geotagged with geographical identification meta data (for example, coordinates of a geographic location). Computing system 101 may compare an updatable image 204 against a catalogue of known images to determine whether updatable image 204 contains a known place of interest, or may determine that updatable image 204 is for a place of interest from geographical identification meta data embedded within updatable image 204.

On detecting that an updatable image 204 is related to a place of interest, an interactive control 206 (for example, a button, hyperlink, or the like) is displayed with the image for initiating a request for an update of a image. When the control is activated, a request for a recent image is sent to and received by computing system 101. Computing system 101 then distributes the request to other subscribed users who are at or near the place of interest. In one example, a first user may search for a place of interest, and then use control 206 to make a request for a recent image of the place of interest.

As described previously, users may subscribe to an online image service that allows users to provide other users images of places of interest on request. In this regard, webpage 202 may be a user interface that provides a digital representation of a place of interest to a user as part of a message in a social media activity stream, SMS message, online photo catalogue, digital map, or other medium capable of providing digital pictures and other graphics to the user. In some implementations, control 206 may be displayed in connection with a non-image representation 207 of a place of interest. Such a representation may include, for example, a snippet of text in a message posted to a social media activity stream, or returned in response to a search result, a point on a digital map, or the like.

Figure 3:
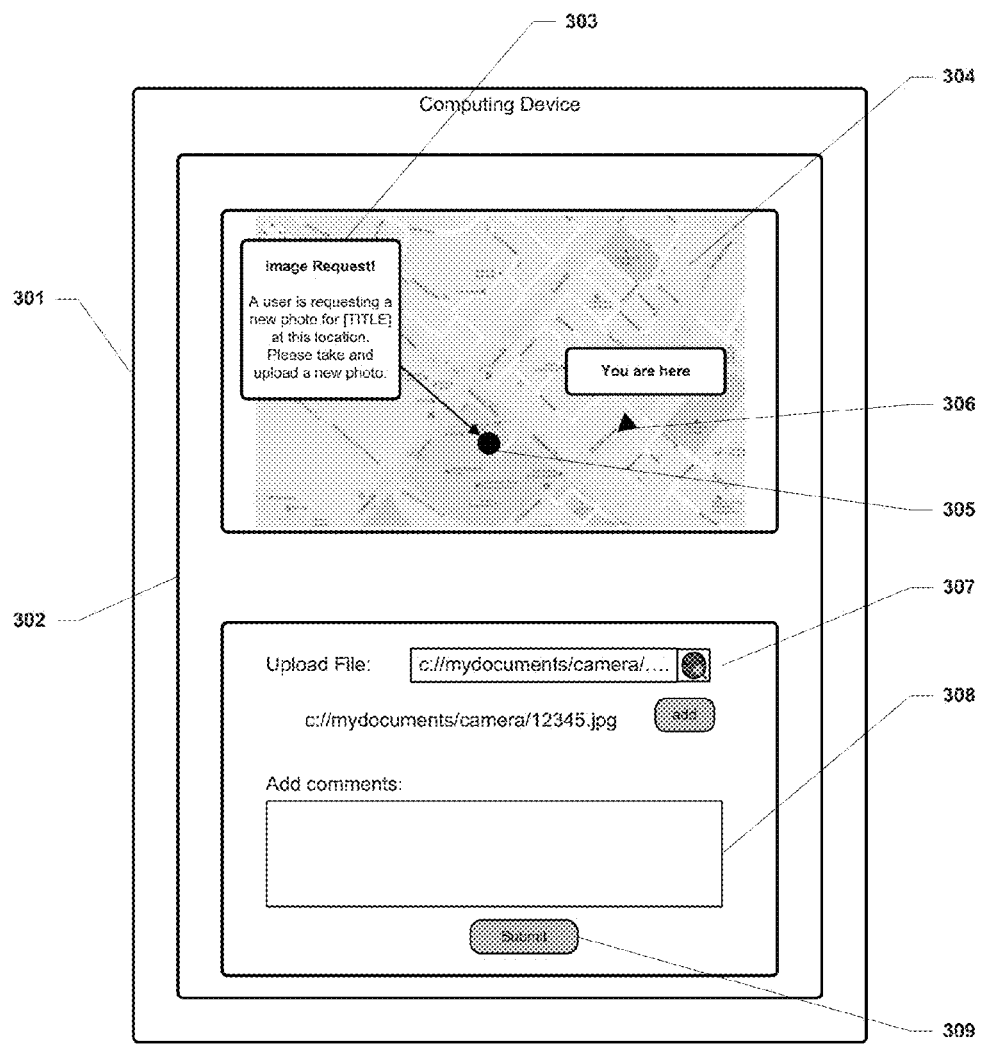
FIG. 3 depicts an example computing device, including a user interface for uploading a new image for a place of interest.

FIG. 3 depicts an example computing device 301, including a user interface 302 for uploading a new image for a place of interest, according to one aspect of the subject technology. Computing device 301 may be a smartphone, personal or notebook computer, tablet computer, PDA, or other display device with one or more location-aware devices embedded therein or attached thereto. Computing device 301 may further be configured with a camera for taking and storing images on a memory of computing device 301.

Computing device 301 is associated with a subscribed user and configured to, on the express consent of the subscribed user, periodically and anonymously notify computing system 101 of the device's location. In one example, device 105 includes one or more setup screens that enable the user to configure computing device 301 to temporarily transmit travel data. The travel data may include geographic coordinate readings (for example, latitude/longitude, Cartesian coordinates, GPS data, or the like). On confirmation of user consent, travel data is transmitted for the limited purpose of providing computing system 101 the ability to determine whether a user is at or near an area corresponding to a request for an update image of a place of interest in the area. Location data may be encrypted and then transmitted to, and stored at, computing system 101 for windows of predetermined periods of time (for example, the last hours). During a journey, computing device 301 may periodically inform the user (for example, by way of a blinking icon on the device's display screen) that the device is transmitting travel data. The setup screens may further enable the user to revoke or modify the user's consent in allowing the transmission or use of the travel data at any time.

As described previously, computing system 101, when a request is received for a place of interest, informs those subscribed users who are within a predetermined distance from the place of interest of the request. In another aspect, computing system 101 may continuously determine, for predetermined areas, an average number of subscribed users present in the areas for predetermined periods of time (for example, each hour in a day). When a request is received, if there is no subscribed user at or near the place of interest, computing system 101 provides the requesting user with time periods in which subscribed users are determined to likely be present. In this regard, computing system 101 may provide an average number of users near the place of interest during the provided time periods. The requesting user then selects a period of time for the request to be sent, and the system informs a second user who is at or near the place of interest during the selected time period.

On receiving a request for an updated image for a place of interest from a first user, computing system 101 informs a second user of the request. Computing device 301 may notify the second user of the request by displaying a notification 303. In the depicted example, user interface 302 includes a digital map 304 that depicts the location 305 of the place of interest, and the current location 306 of the second user. If computing device 301 includes a digital camera, the second user may then navigate, using digital map 304 to location 305, and use the camera to take a digital image of the place of interest. In other aspects, the second user may capture the image using a separate device and then transmit the image to computing device 301. If the request is for an updated image of a product then the second user may respond by finding the product, verifying the product identifier, if any, and using the camera to take a digital image of the product.

User interface 202 may further include one or more controls 307 for uploading one or more images to computing system 101. Additionally, user interface 202 may include an text input control 308 for input of a character-based message or description to be provided in connection with an uploaded image. Once an image file has been selected, the user of computing device 301 may then activate a submit button 309 to upload the digital image to computing system 101. In response to receiving the digital image, computing system 101 provides the digital image to the first user. In one example, the new digital image updates a current image, and the first user is notified that the current image was updated (for example, by email, SMS message, or notification indicator on a display of a computing device 301 associated with the first user). In some implementations, the current image may be updated in real-time while being viewed by the first user.

Figure 4:
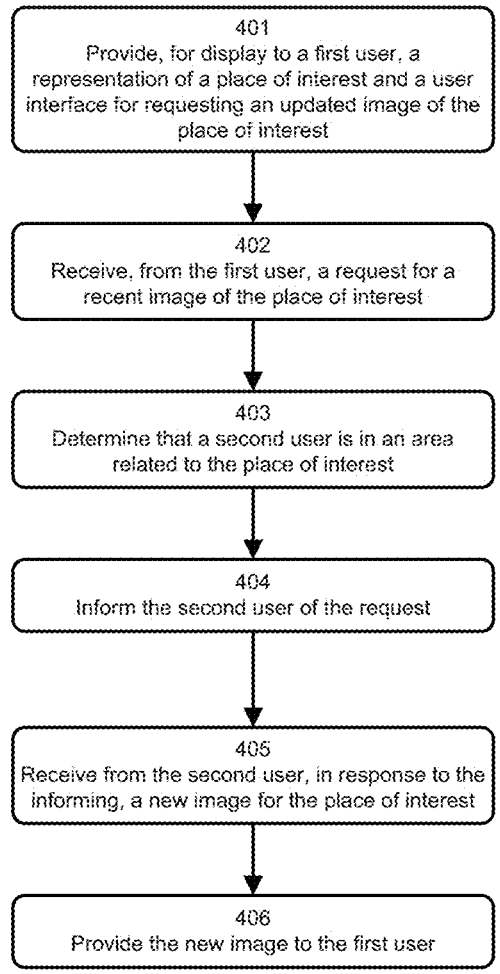
FIG. 4 is a flowchart illustrating an example process for requesting and obtaining an updated digital image for a place of interest.

FIG. 4 is a flowchart illustrating an example process for requesting and obtaining an updated digital image for a place of interest, according to one aspect of the subject technology. According to some aspects, the blocks of FIG. 4 may be executed by one or more computing devices (for example, a desktop or server computer, tablet or notebook computer, personal data assistant, smart phone, a television or other display device with one or more computing devices embedded therein or attached thereto, or the like). In this regard, the blocks of FIG. 4 may be performed within the context of an online image sharing or social network application provided by the one or more computing devices.

In block 401, a representation of a place of interest and a user interface for requesting an updated image of the place of interest are provided for display to a first user. The representation may include, for example, a current image of the place of interest, location on a digital map, message or snippet of text in a social media, blog, email, or search result, and other types of displayable media that may describe an image or for which could be supplemented by a new image. The user interface may include a single button for requesting an updated image for the place of interest. On making a request, the user interface may further interact with the user by displaying when the request may likely be completed, requesting from the user an email address or other information related to how an updated image for the place of interest may be provided to the user, and the like.

In block 402, a request for a recent image of the place of interest is received from a first user. The request is made on activation of a control corresponding to the image to be updated. The request may be sent from instructions embedded within a webpage displaying the image and/or control, and received by computing system 101 in the previously described manner.

In block 403, a second user is determined to be in an area related to the place of interest. In one example, computing system 101 receives, for one or more users, an indication and a time that the one or more users visited the area. On receiving an number of indications over a period of time, computing system 101 determines an average number of users that are present in the area for one or more periods of time. The periods of time may be repeatable, for example, every Monday between 1:00 and 2:00 pm. In response to receiving the request, the one or more periods of time in which the average number of users in the area satisfies a predetermined threshold are provided to the first user. Accordingly, the first user then makes a selection, and the selected period of time is sent to and received by computing system 101.

In block 404, the second user is informed of the request. Computing system 101 may transmit a message to one or more users in a geographic area related to the place of interest via one or more respective computing devices 301. The second user who is informed of the request may then capture a new image for the place of interest and transmit (for example, upload) the new image to computing system 101 for storage at storage 102.

In block 405, a new image for the place of interest is received from the second user, in response to the informing, and, in block 406, a new image is provided to the first user. As described previously, the new image may be displayed in the same manner as the original representation, for example, on a webpage responsible for display of the representation. In some implementations, providing the new image to the first user includes sending a notification to the first user, to notify the first user that the representation has been updated with the new image. Additionally or in the alternative, the new image may be sent to the first user in connection with an email, social media message, or other messaging protocol.

Figure 5:
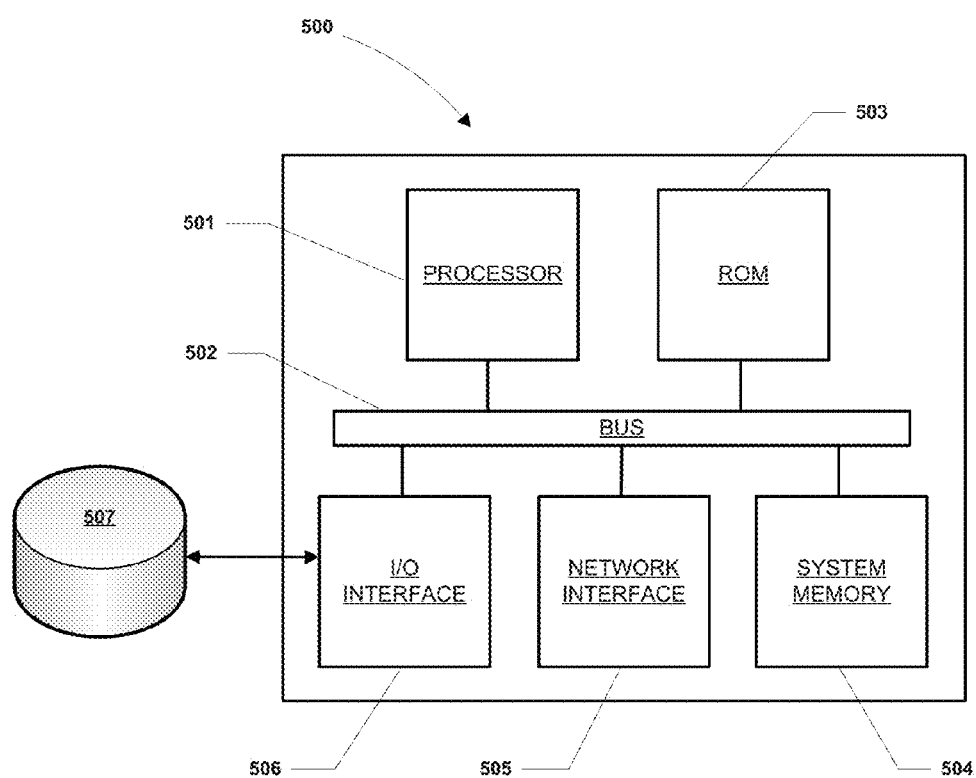
FIG. 5 is a diagram illustrating an example computing system for requesting and obtaining an updated digital image for a place of interest, including a processor and other internal components.

FIG. 5 is a diagram illustrating an example computing system for indicating to members of a social network that a user previously visited a place of interest based on a token obtained from an event at the place of interest, including a processor and other internal components, according to one aspect of the subject technology. In some aspects, a computing device 500 (for example, a computing device of computing system 101, computing device 301, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from ROM 503, system memory 504, or received from a storage medium 507 (for example, via I/O interface 506). ROM 503, system memory 504, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, a tablet computer, a television with one or more processors embedded therein or coupled thereto, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. The word "example" is used herein to mean "serving as an example or illustration." Any aspect or design described herein as "example" is not necessarily to be construed as preferred or advantageous over other aspects or designs. Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   providing, for display to a first user and using one or more processors, a group of images for display to the first user;
   determining, using one or more processors, one or more images of the group of images are related to a geographic location and a representation of a place of interest;
   displaying, in connection with one or more of the group of images and using one or more processors, a control for initiating a request for an update of a corresponding image;
   receiving, from the first user and in response to activation of the corresponding control, a request for a recent image of the place of interest;
   informing, using one or more processors, a second user of the request;
   receiving from the second user, in response to the informing, a new image for the place of interest; and
   providing, using one or more processors, the new image to the first user.

2. The computer-implemented method of claim 1, further comprising:
   before informing the second user, determining that the second user is in an area that includes the place of interest.

3. The computer-implemented method of claim 2, further comprising:
   receiving, for one or more users, an indication and a time that the one or more users visited the area;
   determining an average number of users that are present in the area for one or more periods of time;
   providing, in response to receiving the request, one or more periods of time in which the average number of users in the area satisfies a predetermined threshold; and
   receiving, from the first user, a selected period of time for the request,
   wherein the step of informing is performed during the selected period of time.

4. The computer-implemented method of claim 1, wherein the representation of the place of interest is provided to the first user in response to a search for subject matter related to the place of interest.

5. The computer-implemented method of claim 1, further comprising:
   storing, for the first user, a number of requests made by the first user for a predetermined period of time; and
   verifying, on receiving the request, that the first user has not exceeded a maximum number of requests before informing the second user of the request.

6. The computer-implemented method of claim 1, further comprising:
   storing, for the first user, a number of requests made by the first user and a number of times that the first user provided an updated image in response to a request from another user; and
   verifying, on receiving the request, that a ratio between the number of requests made by the first user and the number of times that the first user provided an updated image satisfies a predetermined threshold before informing the second user of the request.

7. The computer-implemented method of claim 1, further comprising:
   receiving, from a mobile device associated with the second user, an indication that the mobile device is in an area that includes the place of interest; and
   transmitting a message to the mobile device to inform the second user of the request.

8. The computer-implemented method of claim 1, wherein the new image is a digital photo or video file that depicts the place of interest.

9. The computer-implemented method of claim 1, wherein the representation of the place of interest is provided for display to the first user in connection with a web page viewed by the first user, and wherein providing the new image to the first user comprises updating the representation with the new image.

10. The computer-implemented method of claim 1, wherein providing the new image to the first user comprises updating a current display of a current image for the place of interest.

11. A non-transitory machine-readable medium having instructions stored thereon that, when executed, cause a machine to perform a method, the method comprising:
   receiving, for one or more users, an indication and a time that the one or more users visited the area;
   determining an average number of users that are present in the area for one or more periods of time;
   providing, for display to a first user, a representation of a place of interest and a user interface for requesting an updated image of the place of interest;
   receiving, from the first user, a request for a recent image of the place of interest;
   providing, in response to receiving the request, one or more periods of time in which the average number of users in the area satisfies a predetermined threshold;
   receiving, from the first user, a selected period of time for the request;

determining that a second user is in an area related to the place of interest;
informing the second user of the request during the selected period of time;
receiving from the second user, in response to the informing, a new image for the place of interest; and
providing the new image to the first user.

12. The non-transitory machine-readable medium of claim 11, wherein the representation of the place of interest is provided to the first user in response to a search for subject matter related to the place of interest.

13. The machine-readable medium of claim 11, the method further comprising:
storing, for the first user, a number of requests made by the first user for a predetermined period of time; and
verifying, on receiving the request, that the first user has not exceeded a maximum number of requests before informing the second user of the request.

14. The non-transitory machine-readable medium of claim 11, the method further comprising:
storing, for the first user, a number of requests made by the first user and a number of times that the first user provided an updated image in response to a request from another user; and
verifying, on receiving the request, that a ratio between the number of requests made by the first user and the number of times that the first user provided an updated image satisfies a predetermined threshold before informing the second user of the request.

15. The non-transitory machine-readable medium of claim 11, the method further comprising:
receiving, from a mobile device associated with the second user, an indication that the mobile device is in an area that includes the place of interest; and
transmitting a message to the mobile device to inform the second user of the request.

16. The non-transitory machine-readable medium of claim 11, wherein the representation of the place of interest is provided for display to the first user in response to a search query for subject matter related to the place of interest.

17. The non-transitory machine-readable medium of claim 11, wherein the representation is a digital photo or video file that depicts the place of interest, and wherein providing the new image to the first user comprises notifying the first user that the representation has been updated with the new image.

18. A system, comprising:
one or more processors; and
a memory including instructions that, when executed by the processor, cause the processor to:
provide, for display to a first user, a representation of a place of interest and a control for requesting an updated image of the place of interest;
receive, from the first user, a request for a recent image of the place of interest;
storing, for the first user, a number of requests made by the first user and a number of times that the first user provided an updated image in response to a request from another user; and
determine that a second user is in an area related to the place of interest;
inform the second user of the request when the ratio between the number of requests made by the first user and the number of times that the first user provided an updated image satisfies a predetermined threshold;
receive from the second user, in response to the informing, a new image for the place of interest;
update the representation with the new image; and
provide, for display to the first user, the representation updated with the new image.

* * * * *